United States Patent [19]
Rothe et al.

[11] 3,919,288
[45] Nov. 11, 1975

[54] METHOD FOR DISCONTINUOUS ESTER INTERCHANGE OF ESTERS OF DICARBOXYLIC ACIDS WITH ALIPHATIC DIOLS

[75] Inventors: Hans-Jochen Rothe, Offenbach, Main; John H. Oxley, Berlin; Francois Terrier, Frankfurt am Main, all of Germany

[73] Assignee: Zimmer Aktiengesellschaft, Germany

[22] Filed: Jan. 23, 1973

[21] Appl. No.: 326,028

Related U.S. Application Data

[63] Continuation-in-part of Ser. No. 832,785, June 12, 1969, abandoned.

[30] Foreign Application Priority Data
July 12, 1968 Germany............................ 1768923

[52] U.S. Cl............................. 260/475 P; 260/75 M
[51] Int. Cl............................................ C07c 69/82

[58] Field of Search............................... 260/475 P

[56] References Cited
UNITED STATES PATENTS
2,932,625  4/1960  Burton et al. ................ 260/475 P FOREIGN PATENTS OR APPLICATIONS
48,693  6/1965  Germany

*Primary Examiner*—Lorraine A. Weinberger
*Assistant Examiner*—E. Jane Skelly
*Attorney, Agent, or Firm*—Molinare, Allegretti, Newitt & Witcoff

[57] ABSTRACT

Process for a batch-wise ester-interchange reaction between esters of bifunctional carboxylic acids and bifunctional aliphatic alcohols wherein the addition of the diol to the ester follows a time relationship which is within the polygon shown in FIG. 1, and wherein the end temperature and molar ratio relationship is within the polygon shown in FIG. 2.

8 Claims, 9 Drawing Figures

METHOD FOR DISCONTINUOUS ESTER INTERCHANGE OF ESTERS OF DICARBOXYLIC ACIDS WITH ALIPHATIC DIOLS

CROSS REFERENCE TO RELATED APPLICATION

This application is a continuation-in-part of our copending application, Ser. No. 832,785, filed June 12, 1969, now abandoned, the teachings of which are incorporated by reference herein.

BACKGROUND OF THE INVENTION

This invention relates to a process for the discontinuous ester interchange of esters of bifunctional carboxylic acids with bifunctional aliphatic alcohols (diols), in which the diol is placed in a reaction vessel and heated and subsequently the carboxylic acid ester is gradually added in doses to the diol, while the monoalcohol being liberated is continuously removed from the reaction vessel.

Such ester-interchange process is used on a large industrial scale in the production of polyesters. For example, there are used as the ester of a bifunctional carboxylic acid the dimethyl terephthalate and as diol the ethylene glycol (hereinafter briefly designated as glycol) as starting products. In order to accelerate the ester-interchange process, i.e. in order to make it possible to operate economically, there is generally added a special ester-interchange catalyst of which there are a large number. Zinc acetate and manganese acetate belong in this context to the preferred ester-interchange catalysts.

From considerations of process technology and economy, however, not only is there to be recommended the use of catalysts, but there are a number of other points to be heeded. Thus, for example, out of mere considerations of costs, the excess of glycol must be kept as low as possible. On the other hand, there is the fact that the ester-interchange reaction takes place more rapidly with a large excess of glycol. In addition, a high glycol excess suppresses the condensation (Ankondensation) of the ester-interchange product, which is designated in the following as bis-β-hydroxyethyl terephthalate, although by this designation oligomers are also to be understood.

In order to make possible a complete formation of bis-β-hydroxyethyl terephthalate, it is necessary to use the two reactants in stoichiometric proportions. This would mean that per mole of dimethyl terephthalate there are used two moles of glycol. The stoichiometric ratio for the ester interchange, however, represents in respect to the end product an excess, since in the polycondensation a part of the glycol again becomes free and has to be removed from the polycondensation reactors in a known manner by application of a vacuum or in an inert gas stream. Both the unavoidable boiling process in the ester-interchange reactor and the liberation of glycol during the polycondensation cause a considerable amount of glycol to be boiled at elevated temperatures in the circulation, in which process the glycol is partially decomposed and/or enriched with impurities. The consequence is that this glycol cannot be reused, without special preparation, for a repeated ester interchange. As a rule, the degraded glycol distilled off is supplied either to special recovery installations or returned to the glycol producer at disadvantageous prices.

There exists, accordingly, a considerable interest in reducing the amount of glycol used, whereby both the glycol requirement and energy requirement for a certain amount of polyester and simultaneously the amount of waste glycol and thereby the costs for its preparation are reduced. The operation of the ester-interchange reactor at substoichiometric molar ratios has the result that the condensation of bis-β-hydroxyethyl terephthalate increases already in the ester-interchange reactor; however, such condensation does not have negative effects on the properties of the ester-interchange product. On the contrary, the condensation in the ester-interchange reactor has the advantage, in charge-wise operation, that the polycondensation time, in itself relatively long, is reduced, whereby the number of charges per time unit, generally dependent on the polycondensation time, can be increased.

It is possible to increase the ester-interchange speed and the reaction temperature with the application of excess pressure. However, in such case, independent of the nature of the ester-interchange catalyst used and the ester-interchange temperature, considerable amounts of diglycol ethers are formed, which impair the quality of the end product and lower the yield. The use of higher ester-interchange temperatures, accordingly, is a measure which must be handled with extreme caution.

The use of low molar ratios on the order of magnitude of 1.5 moles of glycol to 1 mole of dimethyl terephthalate with ester-interchange times of 30 to 45 minutes is described, for example, in British patent 578,079. In such a process, the total amounts of dimethyl terephthalate and glycol are charged into the reaction vessel at the beginning of the ester interchange step. The disclosed reactions were achieved, furthermore, only on a laboratory scale and with strongly alkaline catalysts at high concentration. Such catalysts favor side reactions, which lower the quality of the product. In practice, therefore, despite the rapid course of the reaction, catalyst systems on a strongly alkaline basis are not usable in the concentration indicated.

In U.S. Pat. No. 2,932,625, there is further illustrated a process for the production of polyesters in which the ester interchange takes place at molar ratios between 1.3:1 and 1.5:1, for the glycol and ester, respectively. In this case, the entire amounts of dimethyl terephthalate and ethylene glycol are also totally present in the reaction vessel at the commencement of the ester-interchange step. The shortest ester-interchange time given amounts to 3 hours and 30 minutes despite the use of ester-interchange catalysts and ester-interchange temperatures of about 290°C. Ester-interchange reactions of such duration and at temperatures over about 250° to 260°C favor the formation of troublesome amounts of diglycol ethers along with other decomposition products. The consequence is an end product with unfavorable properties. In particular, polyesters produced according to the specific examples in this process do not meet today's requirements for tire cord, photography film, and film for magnetic tapes.

In the particular case of fibers, the requirements for acceptable fibers have increased appreciably since the filing of this patent. In 1955 the APHA color number had to be less than about 60. In contrast, in 1972, fibers had to have a APHA color number of less than about 35. In the case of film for magnetic tapes (i.e., video and sound tape recorders and computers), the acceptable amount of diethylene glycol in the polyester has declined from about 4 mol percent to less than 2 mol percent. In addition, photography films and tire cords were not produced from polyesters as illustrated in this reference in 1955.

It is a known practice, through DDR (East German) Patent 48,693, to transesterify "dialkyl esters" with glycols in the presence of catalysts in such a manner that the glycol is put with the catalyst in a reaction vessel and heated to boiling temperature and that the liquefied dialkyl ester is continuously added in doses during the ester-interchange reaction. In this known process, however, there is used a relatively high molar ratio of 2 moles of ethylene glycol to 1 mole of dimethyl terephthalate and an end temperature in the ester interchange which does not exceed 205°C. The consequence is an ester-interchange time of from 3¼ to 2½ hours with high consumption of glycol. To be sure, through the high glycol excess at the beginning of the reaction there is achieved an initially higher reaction speed, but in consequence of the fact that toward the end of the reaction there is reached only a temperature of 205°C and in consequence of the high proportional of glycol a high degree of precondensation is not achieved. A high degree of precondensation, however, is the pre-condition for the rapid attainment of the reaction temperatures required for the polycondensation and for the rapid lowering of the pressure to a few millimeters of mercury in the polycondensation reactors.

In view of the foregoing, the problem faced by the present invention is one of creating a starting product for the polycondensation stage of a polyester process which is economically producible and which is produced in high purity. For this the requirements are a low initial molar ratio and a short reaction time for the production of the bis-$\beta$-hydroxyethyl terephthalate. In this respect, the problem is not simply a matter of reducing the molar ratio of glycol to dimethyl terephthalate, which would have to be paid for by a longer reaction period or a higher reaction temperature with their harmful effects, but it is a matter of being able to use a low molar ratio with short reaction times and good yields of high purity.

It is, accordingly, an object of the present invention to provide a novel ester-interchange process.

It is another object of the invention to provide an ester-interchange process which is capable of producing good yields of high purity polyesters such as photography film, film for magnetic tape and tire cords with short reaction times and low molar ratios of glycol to ester.

These and other objects of the invention can be gathered from a reading of the following description.

SUMMARY OF THE INVENTION

The solution of the problem posed and the elimination of the drawbacks affecting the known processes is accomplished, according to the present invention, by the means that the adding of the carboxylic acid ester in doses to the apportioned diol takes place according to a quantity-time function which is representable by a curve which lies in a polygon shown in FIG. 1. The polygon is represented on the ordinates of a coordinate system on the abscissa of which there is plotted the relative feed time T and on the ordinate of which there is plotted the relative amount of carboxylic acid ester G. The polygon is formed by a straight line which runs through the point $T = 0$ and $G = 0$, and the point $T = 1$ and $G = 1$, another line which represents $T = 0$, and a curve which is described by the function:

$$G = 0.70 + 0.30 \left( \frac{1 - e^{-2T}}{1 - e^{-2}} \right)$$

The process of the invention is further defined by a relationship between the end temperature $t_E$ of the ester-interchange reaction and the total molar ratio M of diol to carboxylic acid ester. This relationship is shown in FIG. 2 as an irregular pentagon in a coordinate system on the abscissa of which there is plotted the total molar ratio M and on whose ordinate there is plotted the end temperature $t_E$, the corner points of the pentagon being determined by the following coordinates (M / $t_E$):

1.8/205°C; 1.8/230°C; 1.2/275°C; 1.2/245°C; and 1.6/205°C.

The process of the invention is carried out at values of $t_E$ and M which lie within this irregular pentagon.

The process of the invention is further defined by a relationship between the molar ratio of diol to ester and the total feed time for the reaction. This relationship is shown in FIG. 4 by the irregular figure in a coordinate system on the abscissa of which there is plotted the molar ratio of diol to ester, M, and on whose ordinate there is plotted the total feed time, $T_E$, in hours. The corner points of the figure illustrated in FIG. 4 are determined, in part, by the following four coordinates (M, $T_E$):

1.2, 1.5 hr; 1.2, 6 hr; 1.8, 1.5 hr; and 1.8, 0.375 hr. The figure is further defined by a straight line which interconnects coordinates (1.2, 1.5 hr.) and (1.2, 6 hr.) and a straight line which interconnects coordinates (1.8, 1.5 hr.) and (1.8, 0.375 hr.). Coordinates (1.2, 1.5 hr.) and 1.8, 0.375) are connected by a curved line defined by the equation $$T_E = \frac{0.3}{M - 1.0}$$

and coordinates (1.2, 6 hr.) and 1.8, 1.5 hr.) are connected by a curved line defined by the equation $$T_E = \frac{1.2}{M - 1.0}.$$

The process of the invention is preferably carried out at values of $T_E$ and M which lie within this irregular figure.

This process is further characterized by the ability to produce polyesters suitable for use as tire cord, photography film and film for magnetic tape. In particular, this process is characterized by the ability to produce a white tire cord with an intrinsic viscosity of more than about 0.9 and a COOH (carboxyl) content of less than about 30–35 × $10^{-6}$ eq/g; photography film of high transparency; and a high resistance film for magnetic recording tapes having a diethylene glycol content of less than about 2.0 mol percent.

BRIEF DESCRIPTION OF THE DRAWINGS AND OF THE PREFERRED EMBODIMENTS

The invention will now be described in detail with reference to the drawings, in which.

Figure 4:
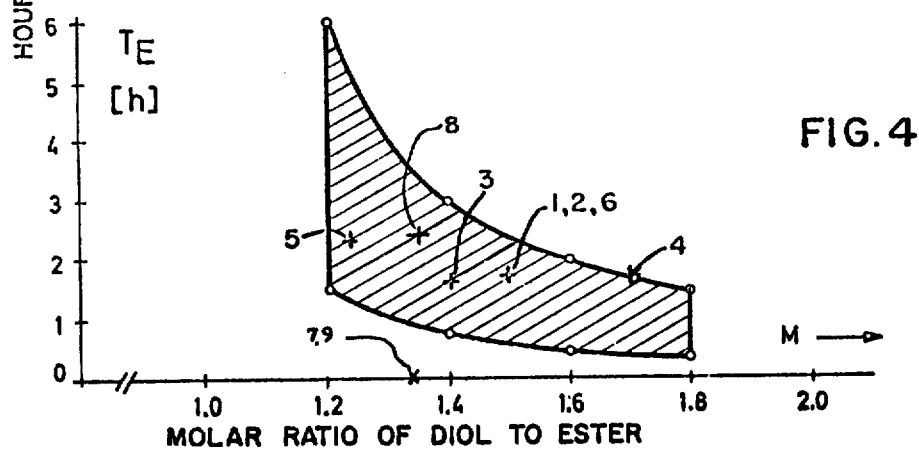

FIG. 3 consists of six graphs, each representing the conditions for a particular example of ester interchange reaction in accordance with the invention; and FIG. 4 represents the dependence of total feed time on the molar ratio for optimal operating conditions for the ester-interchange reaction.

Figure 1:
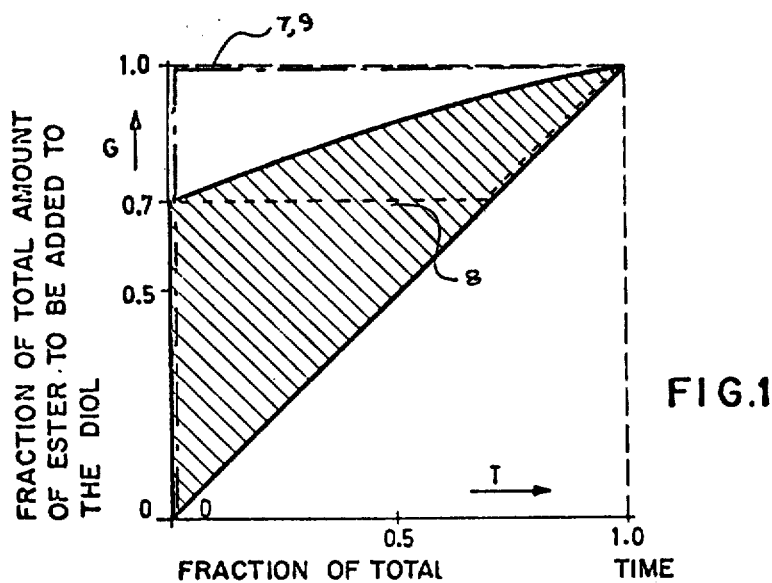
FIG. 1 represents a quantity-time relationship to be followed by the process of the invention.
Figure 3A:
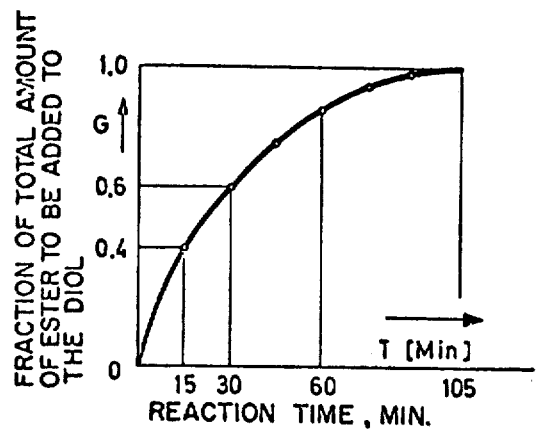

The curve which represents the quantity-time function for the addition of the carboxylic acid ester in doses to the diol, in accordance with the process of the invention, can be greatly varied. What is essential is only that it runs within a surface such as is shown in FIG. 1. Examples of possible curve courses, such as are described in detail in the following process examples, are represented graphically in FIG. 3. FIG. 3 is composed of six graphs referred to as FIG. 3(a), FIG. 3(b), FIG. 3(c), FIG. 3(d), FIG. 3(e) and FIG. 3(f). FIG. 3(a) shows a curve in the form of a polygon which approximates an E-function which proceeds from the zero point of the coordinate system. At the beginning of the process cycle there was no carboxylic acid ester in the reaction vessel, but rather the dosing-in or the addition of the ester started at a constant feed amount per unit time and maintained for 15 minutes. The quotient of feed amount and feed time is designated herein briefly as feed rate and receives the dimension kg per hour. After expiration of 15 minutes, the feed rate was lowered and maintained at the reduced value for 15 more minutes and so forth. The variation of the feed rate was effected by use of a plunger dosing pump with infinitely variable stroke setting.

Figure 3B:
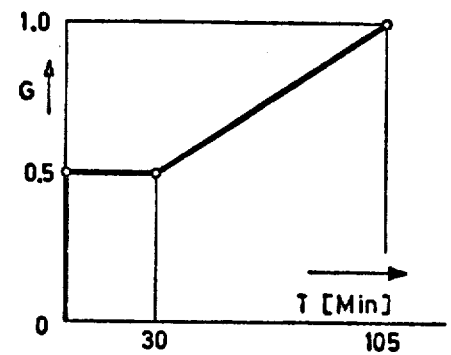
Figure 3C:
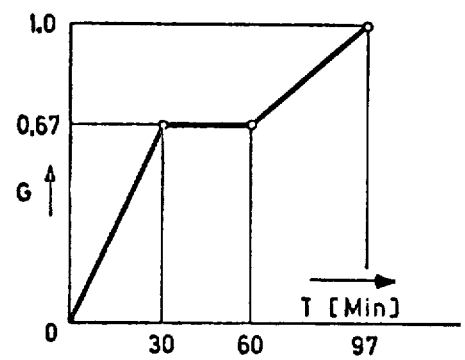
Figure 3D:
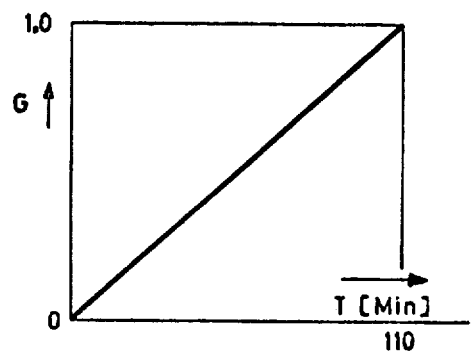
Figure 3E:
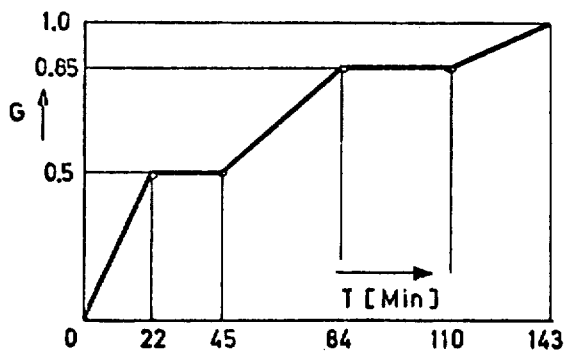
Figure 3F:
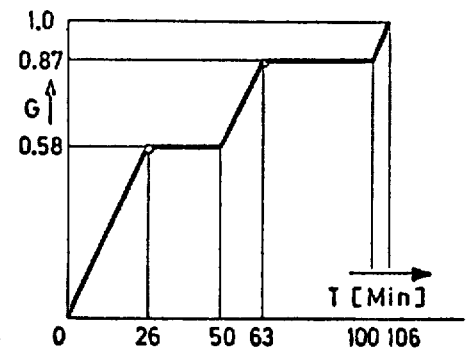

FIG. 3(b) shows another variant of a curve course: Here, 50% of the carboxylic acid ester was charged into the reaction vessel at the beginning of the reaction together with the diol, whereupon the amount of carboxylic acid ester remained unaltered for some time (about 30 minutes in this particular graph). Only after the expiration of this time was the residual carboxylic acid ester added at a constant feed rate. FIGS. 3(c), 3(e) and 3(f) show curves which represent feed programs which consist of sections with equal or altered feed rate as well as of sections in which no carboxylic acid was dosed in (pauses). Finally, FIG. 3(d) shows a feed program in which the carboxylic acid ester was dosed in during the entire feed time at a constant feed rate. In all cases, there was used a plunger dosing pump with adjustable stroke, whose delivery, in the cases according to FIGS. 3(b), 3(c), 3(e) and 3(f), was interrupted at certain intervals by time-dependent switching-off of the motor current. The total feed time $T_E$, in order to make it dimensionless, was designated with the value 1.0 = 100%. By the term "relative feed time" there is meant a corresponding fraction of the total feed time. Likewise, the total amount of carboxylic acid ester $G_E$ to be dosed in, which differs according to the size of the reaction vessel, is made equal to the value 1.0 = 100%. Analogously, by the expression "relative amount of carboxylic acid ester" G, it is meant the fraction of the total amount of carboxylic acid ester dosed-in at time T.

Figure 2:
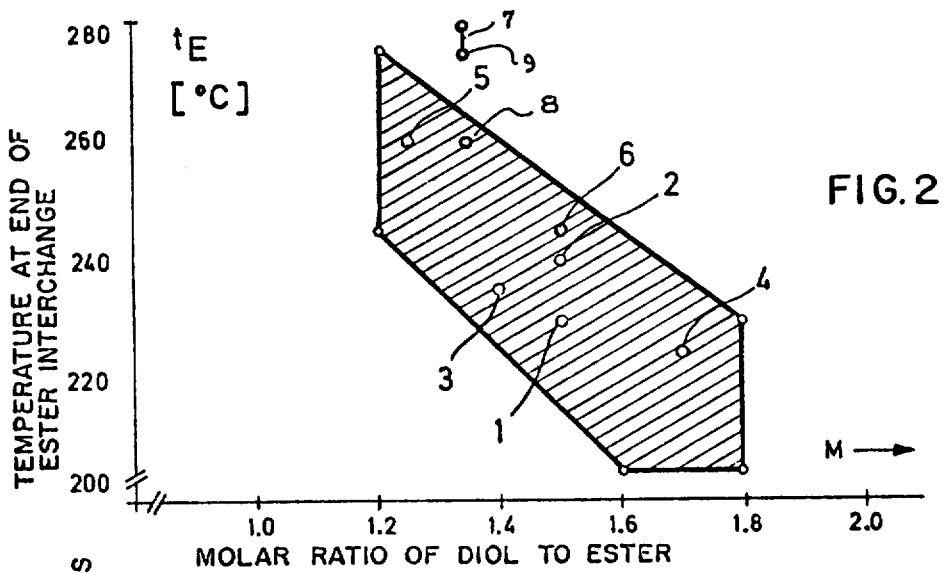
FIG. 2 represents a temperature-molar ratio relationship to be followed by the process of the invention.

The diol excess is infinite at the beginning of the ester-interchange reaction, with the exception of the feed program according to FIG. 3(b). Towards the end of the ester-interchange reaction, the molar ratio reaches a finite value, which has a theoretical character, since at this point of time a part of the diol is already bound in the bis-β-hydroxyethyl terephthalate and its oligomers. By the designation "total molar ratio" M, it is meant the theoretical ratio of the total amount supplied during a process cycle of diol and of carboxylic acid ester. On the total molar ratio there depends also the level of the temperature $t_E$ at the end of the ester interchange reaction, within certain tolerances. This dependence is represented in FIG. 2, in which the optimal operating conditions according to the invention lie within the shaded pentagon. The dependence of the total feed time $T_E$ on the total molar ratio M, within certain tolerances, is shown in FIG. 4, in which the points of optimal operating conditions lie within the shaded area. The points 1 to 9 in FIGS. 2 and 4 relate to the following examples.

Through the teaching according to the invention there are defined process parameters whose maintenance leads to an ester-interchange process with the following advantages. In consequence of the high diol excess present at the beginning of the reaction, there are yielded advantages in the kinetics of the reaction, which lead to a quick start of the reaction. Since towards the end of the reaction there occurs a very severe impoverishment or depletion of the diol, the temperatures can be raised to 230° to 240°C and more. From this there results a higher degree of condensation in the ester-interchange reactor, which condensation in turn yields a part of the diol for the quantitative ester interchange. Hereby, the total ratio of diol to carboxylic acid ester can be reduced to values between 1.2 and 1.8, preferably between 1.3 to 1.5. The increased degree of polycondensation at the end of the ester-interchange stage leads again to a shortening of the polycondensation time in the subsequent process stages, whereby the number of charges per day is increased, since hitherto the reaction time in the polycondensation part of the overall installation was determinative of the capacity. Further, the ether formation is lowered, since towards the end of the reaction less free diol is present in the reaction mixture. With a rapid reaction course, not only is considerably less diol consumed, but also the energy for the evaporation of the diol and the costs of recovery of the evaporated diol drop appreciably.

The process according to the invention is further explained in detail by the following examples. However, these examples are for illustration purposes only, and it is to be understood that the invention is not limited by these examples.

EXAMPLE 1

In a reactor of a capacity of 4 liters with agitating mechanism there were placed: 465 g of ethylene glycol and heated to 190°C as well as 0.3 g Zn $(CH_3COO)_2$. 2 $H_2O$ ester-interchange catalyst. Connected to the reactor was a melter with 970 g of molten dimethyl terephthalate (DMT) at 150°C.

Between melter and reactor there was a plunger dosing pump with infinitely adjustable stroke. The dosing pump delivered molten DMT into the reactor in the following rhythm.

| Feed Time (min.) | 0 | 15 | 30 | 45 | 60 | 75 | 90 | 105 |
|---|---|---|---|---|---|---|---|---|
| Absolute Amount | | | | | | | | |

| -continued | | | | | | | | |
|---|---|---|---|---|---|---|---|---|
| of DMT (g) | 0 | 388 | 582 | 728 | 835 | 922 | 950 | 970 |
| Relative Amount of DMT (%) | 0 | 40 | 60 | 75 | 86 | 94 | 98 | 100 |
| Feed Rate (kg/hr) | 1.552 | 0.776 | 0.584 | 0.428 | 0.348 | 0.112 | 0.080 | |

The feed program corresponds to FIG. 3(a). During the feed time, the reaction temperature was gradually raised to 218°C.

After the total feed time of 105 minutes there was in the reactor a total amount of DMT $G_E = 970$ g, $G = 1.0 = 100\%$. The total molar ratio M now amounted to 1.5. The ester interchange was continued for 25 more minutes, during which the temperature was raised, at normal pressure, to an end value $t_E = 230°C$. The operating conditions corresponded to point 1 in FIGS. 2 and 4. During the entire ester-interchange time the product was constantly agitated, while simultaneously the methanol-glycol vapors were separated in a column and the glycol was returned into the reactor.

The condensed ester-interchange product, after addition of 0.2 g of $Sb_2O_3$ as polycondensation catalyst and 1.0 g of triphenyl phosphite was further polycondensed in an autoclave at a temperature raised during 4 hours to 280°C and with a vacuum of 0.5 torr. The analysis of the end product yielded the following values:

| | |
|---|---|
| Carboxyl group content: | $13 \cdot 10^{-6}$ Equiv/g |
| Diglycol ether content: | 1.4% with reference to mol. glycol |
| Viscosity: | $\eta$ intr. $= 0.55$ |
| Color: | White |

EXAMPLE 2

In a reactor of a capacity of 4 liters with agitating mechanism there were placed 465 g of ethylene glycol together with 485 g of dimethyl terephthalate and they were heated to 185°C. The initial charge of 485 g of DMT represents 50% of the total amount of ester (970 g.) to be added. About 0.3 g Zn $(CH_3COO)_2 \cdot 2 H_2O$, as the ester-interchange catalyst, was also charged into the reactor before the reaction started. The mixture composition remained substantially unchanged for 30 minutes. After 30 minutes, the second half of the DMT was fed in during a time of 75 minutes at a uniform feed rate of 0.388 kg/hr. After 105 minutes, the entire amount of DMT was in the reactor, representing a total molar ratio of 1.5. The feed program corresponding to the curve according to FIG. 3(b); the operating conditions corresponded to point 2 in FIGS. 2 and 4. The ester interchange was then continued for 15 more minutes.

During the entire ester interchange, the temperature was raised gradually to an end temperature of 240°C. The resulting condensed ester-interchange product was polycondensed after addition of 0.2 g $Sb_2O_3$ and 1.0 g of triphenyl phosphite for 6 hours at 280°C, in which process there was yielded a product excellently suited as industrial cord material with the following properties:

| | |
|---|---|
| Viscosity: | $\eta$ intr. $= 0.88$ |
| Diglycol ether content: | 2 mol. % |
| Color: | White |
| Carboxyl groups: | $10 \cdot 10^{-6}$ Equiv/g |

EXAMPLE 3

In an autoclave of a capacity of 130 liters there were placed 26.8 kg of glycol, 18 g of zinc acetate $[Zn(CH_3COO)_2 \cdot 2 H_2O]$, and they were heated to 190°C. At time 0, there was commended the feeding in of molten dimethyl terephthalate (160°C) at a feed rate of 80 kg/hr. After the expiration of 30 minutes, there were 40 kg of DMT in the autoclave, the feed was interrupted for 30 minutes and then recommenced at a rate of 32 kg/hr, until 97 minutes from the start when there were contained about 60 kg of DMT in the reactor. The feed program corresponded to the curve in FIG. 3(c). The total molar ratio now amounted to 1.4 with a total DMT amount of 60 kg. The ester interchange was thereupon continued for 53 more minutes, in which process the temperature was gradually raised to 235°C. The operating conditions corresponded, accordingly, to point 3 in FIGS. 2 and 4. The condensed ester-interchange product, after addition of 36 g of triphenyl phosphite and 24 g of antimony triacetate, was polycondensed for 300 minutes at 275°C and a vacuum of 0.5 mm Hg.

For the polycondensation there was used a special agitator-disk reactor. It consisted of a vessel in the form of two truncated cones which were welded together at their largest circular surfaces, the common axis lying horizontal. In this axis there lay also a shaft with 10 radial agitating plates or disks, whose diameter was adapted to the contour of the reactor vessel. Only the part of the reactor lying below the agitating shaft was filled with polymer product, so that each of the revolving agitating disks drew a film out of the sump, whose large surface was in heat and mass exchange with the surrounding vapor space.

There resulted an end product with the following properties, which was successfuly spun into threads with good textile properties:

| | |
|---|---|
| Viscosity: | $\eta$ intr. $= 0.65$ |
| Diglycol ether content: | 3 mol. % |
| Color: | White |
| Carboxyl groups: | $35 \cdot 10^{-6}$ Equiv/g |

EXAMPLE 4

In an agitator-equipped autoclave of a capacity of 130 liters, there were placed 32.5 kg of glycol and 18 g Zn $(CH_3COO)_2 \cdot 2 H_2O$ and heated to 185°C. Molten dimethyl terephthalate at 155°C was fed into the reactor and within 110 minutes there was supplied the entire DMT amount of 60 kg at a constant feed rate of 32 kg/hr. The feed program was representable by a straight line according to FIG. 3(d). After the end of the feeding of DMT, the ester interchange was continued at a total molar ratio of 1.7 for 10 more minutes with increase of the temperature to an end value of 225°C and the product was run off with addition of 36 g of triphenyl phosphite and 24 g of antimony triacetate into the polycondensation reactor, in which it was polycondensed analogously to Example 3 to a viscosity of η intr. = 0.75. The other material properties were:

| | |
|---|---|
| Diglycol ether content: | 2.8 mol. % |
| Color: | White |
| Carboxyl groups: | $38 \cdot 10^{-6}$ equiv/g |

The product was found to be excellently suited for the production of technical silk. The operating conditions at the end of the ester interchange can be represented by point 4 in FIGS. 2 and 4.

EXAMPLE 5

In an autoclave having an agitator mechanism and a capacity of 130 liters, there were placed 23.9 kg of glycol and 18 g of Zn $(CH_3COO)_2 \cdot 2 H_2O$ and heated to 190°C. In a melter connected to the autoclave there was present the entire molten amount of dimethyl terephthalate of 60 kg at a temperature of 155°C. Between melter and reactor there was a plunger dosing pump with an infinitely adjustable stroke and a time switch, which conveyed DMT into the autoclave according to the following feed program:

| Feed time (Min.) | 0 | 22 | 45 | 84 | 110 | 143 |
|---|---|---|---|---|---|---|
| Absolute amount of DMT (kg) | 0 | 30 | 30 | 51 | 51 | 60 |
| Relative amount of DMT (%) | 0 | 50 | 50 | 85 | 85 | 100 |
| Feed rate (kg/hr) | 80 | 0 (pause) | 32 | 0 (pause) | 16 | |

The feed program corresponded to FIG. 3(e). During the feed time, the reaction temperature under continuous agitation was gradually raised to 245°C. After a total feed time (including the pauses) of 143 minutes the entire DMT amount was in the reactor. The total molar ratio amounted to 1.25. The ester interchange was continued for 62 more minutes, in which process the temperature, at normal pressure, was raised to an end value of 260°C. The operating conditions corresponded to point 5 in FIGS. 2 and 4. The rising methanol-glycol vapors were separated in a column, and the glycol was returned into the reactor. The polycondensation of the ester-interchange product, analogous to Example 3, led to a similar end product.

EXAMPLE 6

In an autoclave equipped with an agitator mechanism and with a capacity of 130 liters, there were placed 28.7 kg of glycol and 24 g of manganese acetate and heated to 190°C. In a melter connected to the autoclave there was present the entire amount of molten dimethyl terephthalate of 60 kg at a temperature of 150°C. Between melter and reactor there was a plunger dosing pump, with an infinitely adjustable stroke and a time switch, which conveyed DMT into the autoclave according to the following feed program:

| Feed time (Min.) | 0 | 26 | 50 | 63 | 100 | 106 |
|---|---|---|---|---|---|---|
| Absolute amount of DMT (kg) | 0 | 35 | 35 | 52 | 52 | 60 |
| Relative amount of DMT (%) | 0 | 58 | 58 | 87 | 87 | 100 |
| Feed rate (kg/hr) | 80 | 0 (pause) | 80 | 0 (pause) | 80 | |

The feed program corresponded to FIG. 3(f). During the feed period of the reaction temperature, under continuous agitation, was gradually raised to 231°C. After a total feed time (including the pauses) of 106 minutes, the entire amount of DMT was in the reactor. The total molar ratio now amounted to 1.5. The ester interchange was continued for 24 more minutes, in which process the temperature at normal pressure was raised to an end value of 245°C. The operating conditions, accordingly, corresponded to point 6 in FIGS. 2 and 4. The rising methanol-glycol vapors were separated in a column, and the glycol was returned into the reactor. The subsequent polycondensation, analogous to Example 3, led to a comparable end product.

EXAMPLES 7, 8 AND 9

In these examples, the process of the present invention was compared with the process specifically shown in U.S. Pat. No. 2,932,625. To insure an accurate comparison, each test was repeated three times and the results presented herein are an average of the three individual tests. In addition, since this patent fails to disclose the heat program used during the ester interchange reaction, an optimum program was developed in an effort to produce the best possible results.

Examples 7 and 9 are representative of the conditions specifically utilized in the patent and are illustrated as points 7 and 9 in FIGS. 2 and 4. The ester interchange reaction was carried out by reacting 486 g of dimethyl terephthalate (DMT) with 209 g of ethylene glycol to provide a molar ratio of ethylene glycol to DMT of 1.35:1. The reation was carried out according to the path set forth in FIG. 1. In this figure the path is defined by a line connecting, in seriatim the points (0,0), (0,1) and (1,1) and is designated by a dot-dash line. This line is slightly offset for purposes of clarity. In Example 7, 0.018% Zn $(CH_3CO_2) \cdot 2H_2O$ and 0.020% $Sb_2O_3$ with respect to DMT was used as a catalyst. The end ester interchange temperature was between 275° and 280°C. Zinc acetate dihydrate was chosen instead of the anhydrous zinc acetate of the patent since it is easier to handle. In this regard, 0.018% dihydrate is equivalent to 0.015% anhydrous acetate.

In Example 9, the catalyst concentration was increased to 0.030% Zn $(CH_3CO_2) \cdot 2H_2O$ to test the effect of higher catalyst concentration on ester interchange time and product quality.

Example 8 was performed according to the process of the present invention and the reaction conditions are defined by point 9 in FIGS. 2 and 4. The catalysts used were 0.030% Zn $(CH_3CO_2) \cdot 2H_2O$ and 0.040% $Sb(CH_3CO_2)_3$ initially with 0.08% TNPP inhibitor (trinonylphenyl phosphite) added at 240°C. The 0.040% $Sb(CH_3CO_2)_3$ is equivalent to 0.02% $Sb_2O_3$. The end temperature of the ester interchange reaction was 260°C. Initially 340 g of DMT were mixed with 209 g of ethylene glycol followed by continuous addition of 146 g of DMT between 1 hr. 40 min. and 2 hr. 30 min. of the ester interchange reaction. This sequential mode of addition is defined by dotted line 8 in FIG. 1 and comprises a line connecting the points (0, 0.7), (0.70, 0.7) and (1, 1). This provides the same ethylene glycol to DMT ratio of 1.35:1 as used in Examples 7 and 9.

In all examples, the polycondensation was run at 0.1 mm Hg at a temperature of 275°–280°C for 2, 4 or 6 hours depending on the exact final product desired.

Presented in Table 1 are the ester interchange times required, the quality of the ester interchange product and the quality of the final polycondensation product. The quality of the ester interchange product is measured by the percentage of aldehyde (i.e., formaldehyde or acetaldehyde) in the distilled methanol. Amounts in excess of 0.1% are indicative of degradation during ester interchange reaction.

The DEG (diethyl glycol) content in the final product was determined by gas chromatography. A high DEG content is indicative of a low softening point.

The APHA number is a standard reference number for color and is obtained by dissolving polyester chips in solvent and comparing the resultant solution to standard solutions. An APHA number of less than or equal to 40 is indicative of a very white product. An APHA number greater than or equal to 70 indicates a colored product.

The intrinsic viscosity ($\eta$intr.) was determined by standard techniques now in use. The same methods were used in each example. A direct comparison with the values present in the reference patent cannot be made because the reference fails to disclose the exact method used to determine the viscosity.

quality polyesters because the polyester has an excessive DEG content.

Additionally, when the polycondensation time was increased from 2 hours to 4 and 6 hours as necessary to produce polyesters of higher viscosity, especially tire cord material, the process specifically described in the reference patent could not produce an acceptable product.

For example, the process of the present invention produces a white tire cord grade polyester that had an intrinsic viscosity of 0.93 after a 6 hour polycondensation time. In contrast, the process of the prior art (Examples 7 and 9) could not produce a tire cord material in this time because of the low intrinsic viscosity (0.63) and the yellow color of the polyester. While the intrinsic viscosity of the polyester produced according to the reference patent could be increased by larger reaction times and possibly higher catalyst concentration, the resultant product will be strongly colored and will have an excessively high COOH and DEG content. See, for example, Example 9 where a higher catalyst concentration resulted in a worse quality product. The principal differences in the products produced in Examples 7 and 9 and Example 8 is due to the DMT addition techniques since it is well known that TNPP in the small quantities stated has no substantial influence on the quality of the polyester.

Although the examples described exclusively processes employing dimethyl terephthalate and ethylene

TABLE 1

| Example | Conditions | Ester-Interchange | | % Aldehyde in distilled methanol | Polycondensation | | | | |
|---|---|---|---|---|---|---|---|---|---|
| | | Time (h/min) | Degree of Ester-Interchange | | Time (h) | $\eta$intr. | COOH $10^{-6}$ eq/g | DEG mol% | Color APHA no. |
| 7 | 0.018% Zn (CH$_3$CO$_2$); 2H$_2$O + 0.020% Sb$_2$O$_3$ End temperature between 275–280°C | 3 10 | ≥0.98 | 0.2 | 2 4 6 | 0.56 0.65 0.63 | 20 43 55 | 3.7 3.5 3.5 | 30 50 80(yellow) |
| 8 | 0.030% Zn (CH$_3$CO$_2$); 2H$_2$O + 0.040% Sb (CH$_3$CO$_2$)$_3$ + 0.08% TNPP at 240°C End temperature: 260°C, sequential addition of DMT | 2 50 | ≥0.98 | 0.1 | 2 4 6 | 0.57 0.78 0.93 | 15 18 22 | 1.7 1.8 1.6 | 30 35 40 |
| 9 | 0.030% Zn (CH$_3$CO$_2$), 2H$_2$O + 0.020% Sb$_2$O$_3$ End temperature: 275°C | 2 55 | ≥0.98 | 0.3 | 4 | 0.65 | 51 | 3.9 | 100(strong yellow) |

A review of the data presented in Table 1 shows that the process specifically illustrated in U.S. Pat. No. 2,932,625 had shorter ester interchange times than indicated in the patent. This is believed to be due to a better temperature program during the ester interchange reaction, better heat transfer, better mixing and better separation of methanol from the ethylene glycol than was available in 1955. In any event, this prior art process when run at lower temperatures to give a longer reaction time (i.e., 4 hours) produces no significant changes in the quality of the product.

The date presented in Table 1 shows that both the process of the present invention and the process in the reference patent produced a very good fiber quality product after a polycondensation time of 2 hours although the process of the present invention (Example 8) showed less degradation during the ester interchange reaction and contained less COOH groups and diethylene glycol. However, the process of the reference patent is not suitable for the production of film glycol as starting materials, it will be appreciated that the method of the invention is applicable to ester interchange processes of other dicarboxylic acid esters, such as, for example, dimethyl orthophthalate and its mixture with dimethyl terephthalate and other polyvalent alcohols, such as propane diol, butane diol and their mixtures with ethylene glycol with equally advantageous effect.

The invention has been described in detail with reference to particular and preferred embodiments thereof, but it will be understood that variations and modifications can be made within the spirit and scope of the invention as described hereinabove and as defined in the appended claims.

We claim:

1. A process for the discontinuous ester interchange of dimethyl terephthalate with aliphatic diols selected from ethylene glycol, propane diol, butane diol and mixtures thereof, which comprises:

charging said diol into a reactor which is provided with a means for heating the contents therein;

adding said dimethyl terephthalate to said diol at a predetermined rate which is represented by a quantity-time curve which lies within a first polygon formed by a plot of G as the ordinate and T as the abscissa, G being the fraction of total amount of dimethyl terephthalate to be added to the diol, T being the fraction of total feed time, said first polygon being formed by a line representing T = 0, a straight line passing through the two points (G = 0, T = 0) and (G = 1, T = 0), and a curve represented by the equation:

$$G = 0.70 + 0.30 \left( \frac{1 - e^{-2T}}{1 - e^{-2}} \right)$$

said dimethyl terephthalate being added to said diol in a total amount represented by a molar ratio M of the diol to dimethyl terephthalate, and said ester interchange reaction has an end temperature $t_E$ which is not exceeded during the ester interchange reaction, said M and $t_E$ are represented by a point within a second polygon formed by a plot with $t_E$ as the ordinate and M as the abscissa, said second polygon being formed by straight lines connecting the following points seriatim:

$t_E = 205°C$,   $M = 1.6$;
$t_E = 245°C$,   $M = 1.2$;
$t_E = 275°C$,   $M = 1.2$;
$t_E = 230°C$,   $M = 1.8$; and
$t_E = 205°C$,   $M = 1.8$;

said molar ratio of ethylene glycol to ester, M, as a function of total feed time in hours, $T_E$, lying within a figure defined by a plot with M as abscissa and $T_E$ as ordinate, said figure being formed by a straight line passing through the two points (M = 1.2, $T_E$ = 1.5) and (M = 1.2, $T_E$ = 6.0); a curved line defined by the equation $$T_E = \frac{1.2}{M - 1.0}$$

passing through the two points (M = 1.2, $T_E$ = 6.0) and (M = 1.8, $T_E$ = 1.5); a straight line passing through the two points (M = 1.8, $T_E$ = 1.5) and (M = 1.8, $T_E$ = 0.375); and, a curved line defined by the equation $$T_E = \frac{0.3}{M - 1.0}$$

passing through the two points (M = 1.8, $T_E$ = 0.375) and (M = 1.2, $T_E$ = 1.5).

2. A process according to claim 1 wherein said end temperature $t_E$ is 230°C and molar ratio M is 1.5.

3. A process according to claim 1 wherein said end temperature $t_E$ is 240°C and molar ratio M is 1.5.

4. A process according to claim 1 wherein said end temperature $t_E$ is 235°C and molar ratio M is 1.4.

5. A process according to claim 1 wherein said end temperature $t_E$ is 225°C and molar ratio M is 1.7.

6. A process according to claim 1 wherein said end temperature $t_E$ is 260°C and molar ratio M is 1.25.

7. A process according to claim 1 wherein said end temperature $t_E$ is 245°C and molar ratio M is 1.5.

8. A process according to claim 1 wherein said diol is ethylene glycol.

* * * * *